US005938210A

United States Patent [19]

Schatzle

[11] Patent Number: 5,938,210

[45] Date of Patent: Aug. 17, 1999

[54] COATED GASKET MATERIAL AND METHOD FOR MAKING THE SAME

[76] Inventor: Charles F. Schatzle, 7641 Paragon Cir., Grantwood Villiage, Mo. 63123

[21] Appl. No.: 08/927,770

[22] Filed: Sep. 11, 1997

[51] Int. Cl.[6] .......... F16J 15/10

[52] U.S. Cl. .......... 277/650; 277/652; 277/936

[58] Field of Search .......... 277/569, 592, 277/627, 650, 652, 936

[56] References Cited

U.S. PATENT DOCUMENTS

| | | | |
|---|---|---|---|
| 590,345 | 9/1897 | Stewart | 277/627 |
| 793,463 | 6/1905 | McDonald | 277/650 |
| 1,059,061 | 4/1913 | Miller | 277/627 |
| 1,455,809 | 5/1923 | Ritter | 277/936 |
| 2,070,918 | 2/1937 | Peterson | 277/583 |
| 2,330,106 | 9/1943 | Bernstein et al. . | |
| 3,002,776 | 10/1961 | Tschappat . | |
| 3,941,393 | 3/1976 | Bainard | 277/551 |
| 4,223,897 | 9/1980 | Staab et al. | 277/627 |
| 4,299,921 | 11/1981 | Youssef | 277/650 |
| 4,409,283 | 10/1983 | Boyle, Jr. | 277/650 |
| 4,483,539 | 11/1984 | Bindel et al. . | |
| 5,134,030 | 7/1992 | Ueda et al. | 277/537 |
| 5,368,315 | 11/1994 | Viksner . | |
| 5,628,520 | 5/1997 | Ueda et al. | 277/935 |
| 5,765,838 | 6/1998 | Ueda et al. | 277/650 |

*Primary Examiner*—Brian K. Green
*Assistant Examiner*—Marcus Dolce
*Attorney, Agent, or Firm*—Haverstock, Garrett & Roberts

[57] ABSTRACT

The present invention relates to coated substrate materials which are coated with a coating substance preferably containing an amount of oil, so that when in use the coated substrate material will prevent the formation of rust on metal machine parts and piping, and a method for making the coated substrate material and the coating which covers the substrate material. Preferably, the present invention relates a gasket made from a fibrous substrate material which is coated with an amount of an oil and wax admixture, with the gasket used to prevent long term formation of rust on metal parts.

12 Claims, 1 Drawing Sheet

24

22

COATED GASKET MATERIAL AND METHOD FOR MAKING THE SAME

FIELD OF INVENTION

The present invention relates to a fibrous substrate material coated with an oil and wax admixture and methods related thereto. More preferably, the present invention relates to a gasket material made from a fibrous substrate material coated with an oil and wax admixture.

BACKGROUND OF INVENTION

Gaskets are primarily used to seal mechanical joints, with a joint being a place where two things or parts are joined or united. Typically gaskets are used between matched machine parts, flanges, and various joints to prevent the escape of fluids, including liquids and gases, so that the gaskets form a sealing relationship between two parts to prevent the fluids from passing through the junction of the two parts. Generally, gaskets are made from a variety of materials, including rubber and a variety of fibrous cellulose materials, that contain paper, wood pulp, cork, and all types of fillers. Fibrous materials, especially cellulose materials, are used in the construction of gaskets because gaskets made of cellulose will absorb fluids that try to pass through the junction of the matched machine parts or pipes. Often cellulose materials are used to form a gasket because they form a physical barrier and absorb moisture which causes the cellulose material to swell and form a tight seal that does not permit the escape of fluid between joints. In essence cellulose gasket materials seal a joint in two ways by forming a physical barrier between two parts and by absorbing fluids that try to pass between the joint. Thus, cellulose gasket materials are advantageous because a desirable seal is formed between two joined parts.

Gaskets made of cellulose will expand and contract with absorption and desorption of fluids into the cellular structure of the gasket. Desorption of some of the fluids causes the release of some of the moisture absorbed into the gasket to be placed onto the surface of the two joined parts. The surface moisture will catalyze an electrochemical reaction which causes metal parts in contact with the gaskets to rust. Rust is undesirable because it can damage machine parts and creates the necessity of having to disconnect the two parts and remove the rust. Even more problematic is that the electrochemical reaction may cause the gasket to bond onto a metal part, which may result in permanent damage to the part or parts. Another problem associated with absorption and desorption of fluids in the gasket material is that wicking will occur on the exterior outside edges of the gasket. Wicking is a process whereby the gasket is deformed and broken down, which eventually results in the degradation of the seal in the joint.

Other gaskets which do not absorb fluids, such as rubber gaskets, may be used. However, gaskets which do not absorb water still allow for rust formation because moisture will still collect around and near the gasket. The water that collects near the non-cellulose gasket will catalyze the electrochemical reaction similar to the moisture released from a cellulose gasket. Thus, gaskets which allow for the collection of moisture are disadvantageous because rust can form which in turn can damage or ruin various parts and prevent them from being used again.

In response to problems associated with rust formation and wicking different gasket compositions have been tried. It appears, however, that none of the gasket compositions have successfully prevented rust formation and wicking, as these two problems almost always occurs in gasket compositions comprised of cellulose materials. In fact all cellulose gasket materials absorb moisture by various means, with wicking frequently occurring on the exterior outside edges. Thus, it would be desirable to have means which prevents rust formation for an extended period of time between matched machine parts, while still allowing for a seal to occur between the parts. Also, it would be desirable to have a cellulose gasket material that does not suffer from wicking. Preferably the means for preventing rust would release an amount of oil for an extended period of time. The released oil would also prevent wicking from occurring.

SUMMARY OF INVENTION

The present invention relates to a substrate material which is exposed to a coating, material selected from the group consisting of oil, wax, and combinations thereof. The preferred coating material contains an amount of oil and is used to form a coated substrate material, with the oil in the coating material being released from the coated substrate material to inhibit rust formation on metal flanges and machine parts. The present invention also relates to methods for forming the coated substrate material. The substrate material can be any of a variety of materials so long as the substrate can be coated with the coating material and preferably oil from the coating or substrate can be released for a sufficient period of time to prevent rust formation. Preferably, the substrate material is made of a fibrous material, which includes mineral fibers, vegetable fibers, animal fibers, or combinations thereof. In general it is most preferred to use a substrate material made of cellulose fibers or a combination of cellulose fibers and polymeric materials.

The substrate material is exposed to an amount of coating substance, with the coating substance preferably being an oil and wax admixture. Typically, the oil and wax admixture will saturate the substrate material so that the oil thoroughly impregnates the substrate and the wax forms a coating around the outer surface of the substrate. Alternatively, the oil may simply form a layer between the coating and the substrate or the oil may be held entirely by the coating. The wax is preferred for use in conjunction with the oil constituent because the wax will perform a function similar to a filter, in that the wax will permit only a small amount of oil to pass away from the coated substrate material. Essentially, the wax will allow the oil to pass from the coated substrate material over a long period of time thereby allowing for long term rust prevention. In addition, the coated substrate material forms an immediate seal without the aid of moisture, keeps the external environment out, and prevents chemical attacks on the interior outer surface of the coated material.

An alternative to the wax and oil admixture coating is to use a coating comprised only of wax or a coating comprised only of oil. Both types of coatings will prevent the collection of moisture on the surface of the flanges and will form an immediate seal without the aid of moisture. A coating only of paraffin wax is especially useful because the paraffin contains an amount of oil that will eventually “sweat” out of the paraffin onto the surface of the flange, so that the paraffin coating alone will function similar to the wax and oil admixture.

Once the coated substrate has been formed it is preferred to cut the coated substrate into a gasket; however, a gasket can be cut from the substrate material prior to coating and then coated to form a coated gasket. Both the coated gasket and coated substrate are advantageous because when used in association with metal parts and piping, the coated gasket and coated substrate will prevent the formation of rust for a sustained period of time on the metal part.

The most preferred device of the present invention is a coated gasket having a fibrous substrate, which is preferably made of cellulose and other fillers, and a coating which is an oil and wax admixture. The method for forming the coated gasket includes the steps of forming the coating mixture containing an amount of oil and exposing the substrate to the coating substance. Additional steps may be added, but at the very least the substrate material must be exposed to the coating substance. More preferably, a hot oil and wax admixture is formed, followed by passing the fibrous substrate material through a hot bath of the oil and wax admixture, followed by passing the coated fibrous substrate through means for removing excess amounts of the coating material, and concluded with cutting the coated substrate material into a gasket.

The present invention is especially desirable because it prevents the formation of rust on metal machine parts and piping contacted by the coated material of the present invention for a period of time equal to at least one year. Generally, the coated material of the present invention will prevent rust formation for a period of time equal to at least ten years.

DETAILED DESCRIPTION

The present invention relates to a coated substrate material and more preferably to a fibrous substrate material coated with an oil and wax admixture, the oil and wax admixture, and methods for making and using the coated fibrous substrate material. Preferably, the coated fibrous substrate material is used in the construction of a gasket device; however, in addition to gasket constructions, the coated fibrous substrate material can be used in a variety of constructions which require a material that is useful in preventing rust formation. A gasket made from the coated fibrous substrate material can be used in association with metal machine parts and piping, as the gasket will prevent the formation of rust and will form a seal between connected metal parts which prevents the escape of fluids. When the coated flange gasket is placed in a flange, rust formation is prevented because an amount of oil from the coated gasket is released onto the flange thereby inhibiting rust formation.

A coated gasket can be formed by coating a gasket made of a fibrous substrate material with a coating, which is preferably a hot oil and wax admixture, or the fibrous substrate material can be coated and then cut into a gasket. Instead of forming a coated gasket, the fibrous substrate material can be coated and used alone in association with metal parts to prevent rust formation on the metal parts. It is most preferred, however, to cut the coated fibrous material into a gasket. Regardless of whether a gasket or some other object is made from the coated fibrous substrate, it is important to recognize that a substrate must be used which will hold an amount of a coating containing an amount of oil and that the oil will be released with the passage of time so as to prevent the formation of rust. As will be discussed, any of a variety of substrates and coating mixtures can be used so long as a sufficient amount of oil is released to prevent rust formation on various metal parts.

Figure 1:
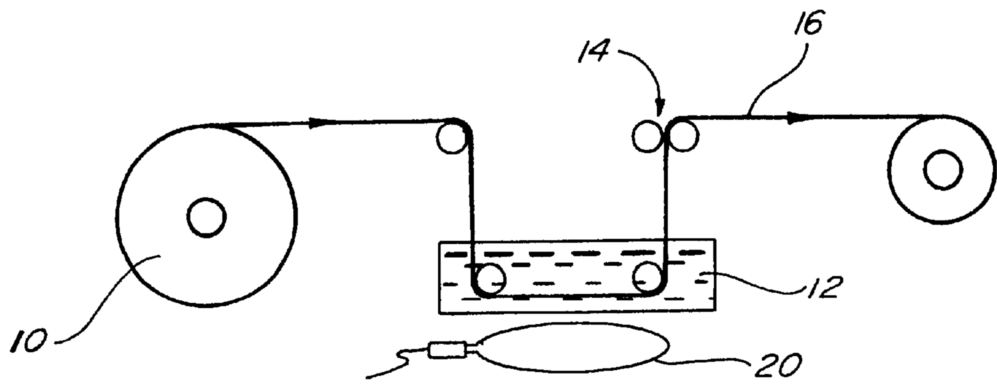
FIG. 1 shows a method for coating a substrate material with an oil and wax admixture, with the temperature of the oil and wax admixture maintained by heating means.

A method for forming the coated substrate material used to form the gasket of the present invention is shown in FIG. 1, so that the fibrous substrate material 10, which is preferably rolled up in sheet form, is unrolled and passed through an amount of coating 12 containing oil, with coating preferably being an oil and wax admixture. After the substrate 10 is coated with the oil and wax admixture it is then passed through means 14 designed to remove excess amounts of the oil and wax admixture from the coated substrate material 16. The removal means 14 is preferably a pair of hot pinch roles which touch the coated substrate material, but do not squeeze the coated substrate material. The oil and wax admixture will immediately dry or solidify after passage through the removal means 14 and prior to rolling up the coated substrate material for storage. This can be accomplished by allowing the coated substrate to air dry for at least one (1) second after passage through the removal means 14. Once the oil and wax admixture has solidified on the substrate material, formation of the coated substrate material is complete and the coated substrate material can then be cut into a gasket 18, shown in FIG. 2, which can be used directly on metal parts, flanges, and fasteners. Further, the method for coating the substrate material will preferably include heating means 20 for maintaining the temperature of the heated oil and waxed mixture. Heating the oil and wax admixture and maintaining the admixture temperature is important because it is necessary to liquefy the wax and to maintain the liquid character of the wax in the oil and wax admixture. If the wax begins to solidify prior to coating the substrate, the substrate may not be adequately coated. A cross section of the coated substrate which is formed into a gasket 18 is shown in FIG. 3, with the cross section of the gasket 18 showing a fibrous substrate 22 and a coating 24 on the surface of the fibrous substrate.

As mentioned, the substrate material, which is coated, can be selected from any of a variety of materials. Any material selected for use as a substrate must have the ability to be coated with a mixture containing an amount of oil and preferably allows for the slow release of the oil. Additionally, it is preferred for the substrate material to be capable of being cut so as to form a gasket. While any of a variety of materials can be used to form a substrate, it is preferred to use a fibrous material which can be coated to form a coated fibrous substrate material or coated substrate. The coated fibrous substrate is preferably formed by treating a fibrous material with an oil and wax admixture, with the wax forming a coating on the surface of the fibrous material through which the oil can pass. The solid coating is formed by the wax, from the oil and wax admixture, cooling on the substrate surface, with the wax allowing for the slow release of the oil from the coated substrate for a period of time equal to at least one (1) year and preferably at least (10) years. The released oil inhibits electrochemical reactions, which in turn prevents rust formation on metal parts.

A fibrous material is preferably used to form the substrate of the coated gasket, with the fibrous material selected from a variety of solid materials comprised of fibers. Fibrous materials are preferred for use as a substrate material because they readily retain an amount of the oil and, when cut into a gasket, form a tight seal between metal parts which prevents the passage of fluids. Also, the fibrous material readily retains an amount of wax from the oil and wax admixture on the surface. The fibrous materials contain fibers selected from the group consisting of natural fibers and semisynthetic fibers, with the natural fibers including animal fibers (such as wool), vegetable fibers (such as cotton), and mineral fibers (such as fillers). The most preferred fibers are vegetable fibers, with the preferred genus species begin selected from the cellulose group, which includes cork, cardboard, and paper compositions. The most desirable cellulose fibrous materials include an amount of other fibers in combination with the cellulose fibers. Not only can the fibrous materials be made from a wide variety of fiber types, but the fibrous materials for use in the coated gasket material are available is a variety of shapes and sizes. Preferably, the fibrous materials are available in rolls of sheets which can be easily coated with the oil and wax admixture. Rolls of fibrous material are also desirable because the rolls can be easily stored and continuously passed through the oil and wax admixture. The thickness of the fibrous material will be dependent upon the desired end use of the gasket; however, the thickness of the gasket will generally range between about 0.015 inches and about 0.060 inches. Other thicknesses can be used. The width of the fibrous substrate material will, like the thickness, be dependent upon the desired finished use of the coated gasket material. Generally, the width of the fibrous material will range between about one (1) inch and about forty (40) inches wide.

A variety of coatings can be used in the present invention, with any of a variety of coatings available so long as they adequately penetrate and saturate the substrate and prevent rust formation. Preferably, the coating is an oil and wax admixture because it has been found that the oil and wax admixture readily adheres to a variety of substrates and releases a sufficient amount of oil over a sufficient period of time to inhibit rust on metal parts for an acceptable period of time. When the substrate is exposed to the oil and wax admixture coating, the oil will generally saturate the substrate and the wax will form a coating on the substrate. However, the oil can form a layer between the substrate and the wax or can be encapsulated in the wax. It does not matter how the oil is held in the substrate so long as the oil is released over a prolonged period of time.

The oil and wax admixture is formed by combining an amount of oil with an amount of wax. When selecting constituents for the oil and wax admixture it is important to choose an oil and a wax which are compatible with one another. Compatibility of the wax and oil of the present invention is achieved by selecting oil and wax constituents which will allow for long term rust prevention characteristics. Ideally a wax is chosen which will allow oil to be released by solidified wax from the oil and wax admixture over a long period of time. This means that the wax will perform a function similar to a filter such that the wax only allows a very small amount of oil to pass through the wax within a long period of time. Thus, oil and wax constituents must be selected that will allow enough oil to pass over time to prevent rust formation, but not allow too much oil to pass so as to inhibit long term rust prevention. If too much oil passes through the wax in a short amount of time the long term rust prevention characteristics of the present invention will be sacrificed. The viscosity of the oil will have some influence over the passage of the oil as well as the type of wax. It has been found that waxes and oils derived from petroleum products are best when used in combination.

The oil used in the admixture is selected from the group consisting of mineral oil, vegetable oil, and animal oil; however, it is preferred to use a mineral oil. Spindle oil is the most preferred species of mineral oil, as spindle oil does not readily degrade, is compatible with a variety of petroleum waxes, and has a viscosity such that it is readily held by the fibrous substrate material. The spindle oil is especially desirable because it is released from the coated gaskets by certain waxes over a long period of time and in a sufficient amount to prevent rust formation. Regardless of the specific oil chosen, it is preferred for the oil to be liquid and have a low viscosity, presumably the low viscosity allows the oil to penetrate the surface of the fibrous material used to make the gaskets. The most preferred oil will have a viscosity of between about 50 and about 100 centipoise at 100° F. and about 10 and about 50 centipoise at 210° F. More preferably, the oil will have a viscosity of about 63 centipoise at 100° F. and about 35 centipoise at 210° F.

The wax, which comprises a portion of the oil and wax admixture, is crucial to the present invention because it prevents the oil from rapidly passing from the fibrous substrate. Without the wax the coated substrate would not have desirable long term rust prevention qualities. Waxes suitable for use in the present invention can be selected from a variety of compositions, including natural waxes and synthetic waxes. Included among the natural waxes are animal waxes, vegetable waxes, and mineral waxes. The mineral waxes, especially petroleum waxes, such as paraffin wax and microcrystalline wax, are preferred because they tend to be the most compatible with the mineral oil compositions. Paraffin wax is most preferred because it has proven to be very compatible with the spindle oil, as the oil is released over a long period of time equal to at least one (1) year and in an amount sufficient to prevent rust formation. Also, the paraffin wax forms a desirable coating on the surface of the fibrous material. It should be noted that both the spindle oil and paraffin wax are petroleum derivatives and that because the two constituents are petroleum derivatives it is believed that this causes the two constituents to be more compatible. The paraffin wax selected most preferably has a melting point of about 160° F., is non-toxic or food grade, and will not break down with the passage of time. Food or medical grade waxes are especially desirable because they allow the coated substrate material, when used with food or medical grade oils, to be used in conjunction with medical and food applications, which require a higher degree of cleanliness and which are less likely to contain toxic substances.

When the oil and wax admixture is formed the amount of the oil and wax constituents combined to form the admixture can be varied. The amount of oil added to the admixture is equal to between about 10% and about 90% by weight of the total admixture and the amount of wax added to the admixture is equal to between about 90% and about 10% by weight of the total admixture. Other amounts of oil and wax can be used, including admixtures comprised of an amount of oil equal to about 50% by weight of the admixture and an amount of wax equal to about 50% by weight of the admixture. A more desirable combination is an amount of wax equal to between about 35% and about 45% by weight of the admixture and an amount of oil equal to between about 65% and about 55% by weight of the admixture. The amount of oil and wax added to the admixture is dependent upon the specific type of oil and wax, as well as the diffusion characteristics desired. The rate at which it is desired for the oil to exit the gasket will determine in part the amount of each oil and wax constituent added to the admixture. Some waxes will more readily hold the oil in the coated fibrous material and thus a lesser amount of wax is required, while the amount of oil is dependent on the viscosity of the oil and how effective the oil prevents electrochemical reactions.

The procedure for forming the oil and wax admixture is preferably initiated by heating a desirable amount of the oil to a temperature of at least 180° F., this can be accomplished by placing an amount of oil in a receptacle capable of being heated, however, other means of heating the oil may be used. The oil is heated because typically the wax is solidified and needs to be liquefied, and the most efficient way of liquefying the wax is to place it in an amount of oil that is then heated. Also, the means for heating the oil can be of a variety of constructions dependent upon the amount of heated oil required for forming the oil and wax admixture and the most efficient way to heat the oil. Preferably the wax is added to room temperature oil and then the oil and wax admixture is heated which causes the wax to melt within the oil. As the wax and oil mixture is heated it is blended to form the oil and wax admixture. The wax and oil can be blended by a variety of means so long as the oil and wax are sufficiently mixed to form the admixture. After the oil and wax admixture is formed it is added to means for coating the fibrous material. The coating means will preferably include heating means 20 to maintain the liquid character of the admixture. If the oil and wax admixture is allowed to cool it will solidify thereby preventing its application to the substrate material. Also, the temperature of the fibrous material should be at least 70° F. when the coating is applied to the substrate.

Once the oil and wax admixture is formed the fibrous material is then coated with the heated, liquid oil and wax admixture. The substrate can be coated in a variety of ways so long as the substrate is sufficiently exposed to the admixture. Means for coating the substrate include passing the substrate through a coating bath, spraying the coating onto the substrate, and a variety of other means are available so long as an adequate amount of coating is placed on the substrate. After the substrate material is coated, it is then passed through the means for removing the excess oil and wax admixture 14, shown in FIG. 1, which is preferably a pair of pinch rollers or similar devices. The pinch rollers remove the excess admixture away from the coated material and maintain an even, constant, and desirable thickness for the flange the coated material is to seal. It is desirable to remove excess coating because this prevents excessive waste of the coating material. The oil and wax admixture is then allowed to solidify on the coated material. Typically, it takes approximately one (1) second for the material to solidify on the coated material; however, other times are permissible. Also, other drying times will occur depending on the specific composition of the oil and wax admixture. Upon solidification of the coating, the coated substrate material is preferably allowed to set for at least twelve (12) hour prior to use so as to allow the oil to permeate the substrate material.

Figure 2:
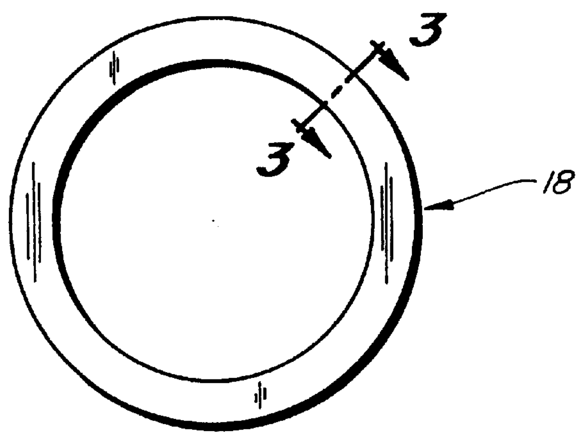
FIG. 2 shows an example of a gasket produced according to the present method; and, FIG. 3 is an enlarged cross sectional view taken along line 3—3 of FIG. 2.
Figure 3:
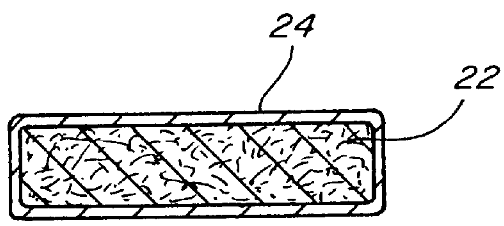

Preferably, the coated material is then passed through a device designed to cut or punch the coated material into gaskets 18, shown in FIG. 2. The gaskets produced from the coated materials are especially desirable because they can be used in conjunction with metal parts and flange of every description and will prevent the formation of rust and the sticking of the gaskets to the parts. It should be noted that the gaskets can be cut into a wide variety of sizes and shapes. One particularly desirable use for the coated gaskets relates to use in horns. Typically, horns will rust with the passage of time where the diaphragm of the horn is contacted by a gasket. The present gasket when used in a horn construction will prevent rust formation on the diaphragm and thus extend the life of the horn, even though the diaphragm is violently vibrated and heated when it makes noise.

Alternatively, it should be noted that wax alone or oil alone can be used as the coating mixture instead of the oil and wax admixture.

Thus, there has been shown and described a novel fibrous substrate material coated with an oil and wax admixture and methods related thereto which fulfill all the objects and advantages sought therefore. It is be apparent to those skilled in the art, however, that many changes, variation, modification, and other uses and applications for the subject method and composition are possible, and also such changes, variations, modifications, and other uses and applications which do not depart from the spirit and scope of the invention are deemed to be covered by the invention which is limited only by the claims which follow.

What is claimed is:

1. A coated material which inhibits electrochemical reactions on metal parts contacted by said coated material so as to prevent formation of rust, said coated material consisting of:

(a) a fibrous substrate material which is made from a fiber sheet selected from the group consisting of natural fibers and semisynthetic fibers; and, (b) an oil and wax admixture, with said oil and wax admixture added to said fibrous substrate material in an amount sufficient to cover and saturate said fibrous substrate material so that said oil and wax admixture solidifies on said fibrous substrate material to form said coated material, with said oil and wax admixture releasing an amount of oil found in said oil said wax admixture over a period of time equal to at least one year with the oil in said oil and wax admixture equal to from about 10% to about 90% by weight of said oil and wax admixture and the wax in said oil and wax admixture equal to from about 90% to about 10% by weight of said oil and wax admixture.

2. The coated material of claim 1 wherein said fiber sheet is a cellulose material.

3. The coated material of claim 1 wherein said oil in said oil and wax admixture is selected from the group consisting of mineral oil, vegetable oil, and animal oil.

4. The coated material of claim 3 wherein said mineral oil is a petroleum oil.

5. The coated material of claim 1 wherein wax found in said oil and wax admixture is selected from the group consisting of natural wax and synthetic wax.

6. The coated material of claim 5 wherein said natural wax is preferably a petroleum wax.

7. The coated material of claim 1 wherein said oil is added to said oil and wax admixture in an amount equal to from about 65% to about 55% by weight of said oil and wax admixture and said wax is added to said oil and wax admixture in an amount equal to from about 35% to about 45% by weight of said oil and wax admixture.

8. A coated gasket for use in a horn mechanism, wherein said gasket releases an amount of oil over a period of time so as to prevent electrochemical reactions from occurring on part of the horn mechanism which in turn prevents rust formation, with said gasket consisting of:

(a) a fibrous substrate material selected from the group consisting of natural fibers and semisynthetic fibers; and, (b) an oil and wax admixture coated onto said fibrous substrate material in an amount sufficient to saturate said fibrous substrate material so that said oil and wax admixture solidifies on said fibrous substrate material to form a solidified coating substance, with said solidified coating substance releasing an amount of oil found in said oil and wax admixture over a period of time equal to at least one year, with the oil equal to from about 10% to about 90% by weight of said oil and wax admixture and the wax in said oil and wax admixture equal to from about 90% to about 10% by weight of said oil and wax admixture.

9. The gasket of claim 8 wherein said fibrous substrate material is a cellulose material.

10. The gasket of claim 8 wherein said oil in said oil and wax admixture is selected from the group consisting of mineral oil, vegetable oil, and animal oil.

11. The gasket of claim 8 wherein a wax found in said oil and wax admixture is selected from the group consisting of natural wax and synthetic wax.

12. The gasket of claim 8 wherein said oil is added to said oil and wax admixture in an amount equal to from about 65% to about 55% by weight of said oil and wax admixture and said wax is added to said oil and wax admixture in an amount equal to from about 35% to about 45% by weight of said oil and wax admixture.

* * * * *